(12) United States Patent
Kikuchi

(10) Patent No.: US 8,103,914 B2
(45) Date of Patent: Jan. 24, 2012

(54) TEST FILE GENERATION DEVICE AND TEST FILE GENERATION METHOD

(75) Inventor: Shinji Kikuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/954,256

(22) Filed: Nov. 24, 2010

(65) Prior Publication Data
US 2011/0066889 A1   Mar. 17, 2011

Related U.S. Application Data

(63) Continuation of application No. PCT/JP2008/060071, filed on May 30, 2008.

(51) Int. Cl.
*G06F 11/00* (2006.01)
(52) U.S. Cl. ........................................ 714/38.1; 717/100
(58) Field of Classification Search .................. None
See application file for complete search history.

(56) References Cited

U.S. PATENT DOCUMENTS

| | | | |
|---|---|---|---|
| 2006/0265691 A1* | 11/2006 | Klinger et al. ............... | 717/124 |
| 2007/0214173 A1 | 9/2007 | Ohashi et al. | |
| 2010/0153909 A1* | 6/2010 | Batey et al. .................. | 717/104 |
| 2010/0293519 A1* | 11/2010 | Groves et al. ................ | 717/101 |

FOREIGN PATENT DOCUMENTS

| | | |
|---|---|---|
| JP | 2003-337697 | 11/2003 |
| JP | 2005-275749 | 10/2005 |
| JP | 2008-059035 | 3/2008 |
| WO | WO 2006/033159 | 3/2006 |

OTHER PUBLICATIONS

International Search Report issued in International App. No. PCT/JP2008/060071, mailed Jul. 8, 2008.
Toru Sasaki et al.; "Consistency Management of UML Model Based on Constraint Rules and Repair Actions;" The Institute of Electronics, Information and Communication Engineers, The IEICE Transactions on Information and Systems, D vol. J90-D No. 4; pp. 1005-1013; Apr. 2007.

* cited by examiner

*Primary Examiner* — Michael Maskulinski
(74) *Attorney, Agent, or Firm* — Greer, Burns & Crain, Ltd

(57) ABSTRACT

A test file generation method for generating a test file for testing a consistency of a work process includes receiving various types of definition information relating to various types of procedures included in the work process, execution sequence of the various types of procedures, a final goal that is a goal that is finally achieved in the work process, sub-goals that are goals that are achieved in the various types of procedures, a constrained condition that is observed when the various types of procedures are executed, an executioner who executes the various types of procedures, and an authority for determining a procedure that can be executed by the executioner, generating a definition file on the basis of the various types of definition information received, and generating a test file that indicates a behavioral model when the work process is executed on the basis of the definition file generated.

15 Claims, 15 Drawing Sheets

FIG.5

```
<?xml version="1.0" encoding="MS932"?>
<activity:ActivityDiagram xmi:version="2.0" xmlns:xmi="http://www.omg.org/XMI" xmlns:xsi
="http://www.w3.org/2001/XMLSchema-instance" xmlns:activity="http://www.nec.co.jp/
xmlnec/mdatools/editors/activity" xmlns:uml="http://www.nec.co.jp/xmlnec/mdatools/
editors/uml" y="-3" id="L9akSVPO" width="809" height="628">
   <labels text="000000" type="ForegroundColor"/>
   <labels text="1" type="LineStyle"/>
   <labels text="FFFFFF" type="BackgroundColor"/>
   <labels text="000000" type="FontColor"/>
   <labels text="MSP GOTHIC" type="FontFamily"/>
   <labels text="9" type="FontSize"/>
   <labels text="false" type="GridEnabled"/>
   <labels text="false" type="GridVisible"/>
   <labels text="false" type="GridForegroundFlag"/>
   <labels text="12" type="GridSpacing"/>
   <labels text="" type="TITLE_NAME"/>
   <nodes xsi:type="activity:ActivityPartition" x="167" y="47" id="L9akTVPO" width="352"
height="527">
      <labels text="WORKER [Operator][Operator]" type="PARTITION_NAME"/>
      <labels text="2" type="version"/>
      <labels text="false" type="AutoResizing"/>
      <labels text="true" type="TextFolding"/>
      <labels text="000000" type="ForegroundColor"/>
      <labels text="1" type="LineStyle"/>
      <labels text="FFFFFF" type="BackgroundColor"/>
      <labels text="000000" type="FontColor"/>
      <labels text="MSP GOTHIC" type="FontFamily"/>
      <labels text="9" type="FontSize"/>
      <nodes xsi:type="activity:InitialNode" x="241" y="9" id="L9akXIWO" outgoings="//
@edges.0" width="20" height="20">
         <labels text="false" type="AutoResizing"/>
         <labels text="true" type="TextFolding"/>
```

FIG.6

```
P1 — AG (EF [Final])
P2 — AG (! [Precondition_error])
P3 — AG (Final -> New_server_added)
P4 — AG (Final -> New_server_addition_granted)
P5 — AG (Final -> User_checked)
P6 — AG (New_server_added -> New_server_addition_granted)
P7 — AG (Login_server -> AF Logout_server)
```

FIG.7

```
MODULE Pout_0_0_0(in_0_0,on_0)
ASSIGN
  next(in_0_0) :=
        case
        in_0_0 > 0 & on_0 < 100 : in_0_0 -1;
        1: in_0_0;
        esac;
next(on_0) :=
        case
        in_0_0 > 0 & on_0 < 100 : on_0 +1;
        1: on_0;
        esac;
FAIRNESS
  running
  MODULE Pout_0_1_2(in_0_1,on_2)
ASSIGN
 next(in_0_1) :=
        case
        in_0_1 > 0 & on_2 < 100 : in_0_1 -1;
        1: in_0_1;
        esac;
next(on_2) :=
        case
        in_0_1 > 0 & on_2 < 100 : on_2 +1;
        1: on_2;
        esac;
FAIRNESS
  running
  MODULE Pin_0_1_6(on_6_0,in_1)
ASSIGN
```

FIG.8

```
 init(Login_server):= 0 ;
next(Login_server):= Login_server;
 init(New_server_added):= 0 ;
next(New_server_added):= New_server_added;
 init(User_checked):= 0 ;                                    81
next(User_checked):= User_checked;
 init(Manager_Has_authority_Grant_):= 1 ;
next(Manager_Has_authority_Grant_):= Manager_Has_authority_Grant_;
 init(Logout_server):= 0 ;
next(Logout_server):= Logout_server;
 init(Operator_Has_skill_Operate_server_):= 1 ;
next(Operator_Has_skill_Operate_server_):= Operator_Has_skill_Operate_server_;
```

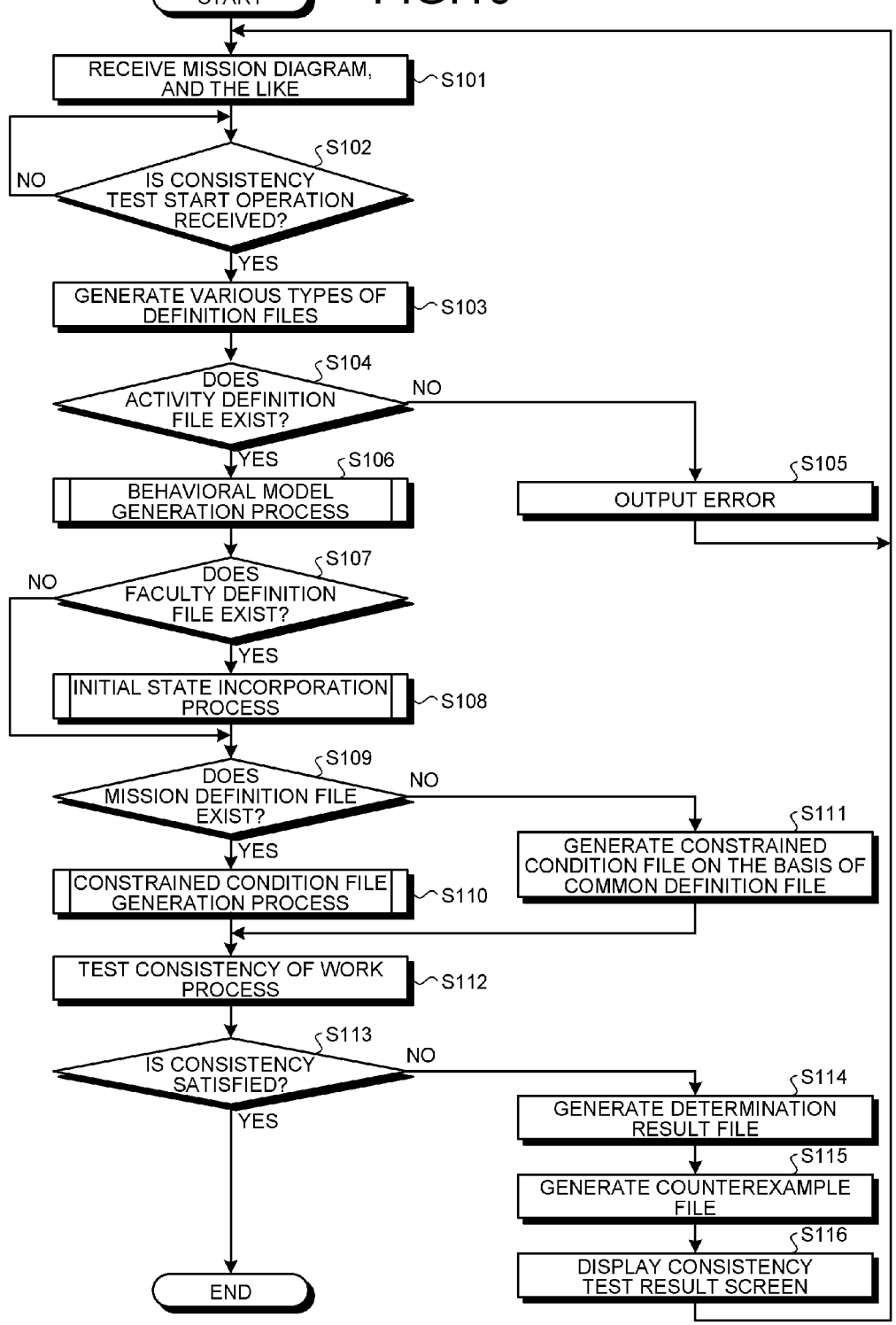

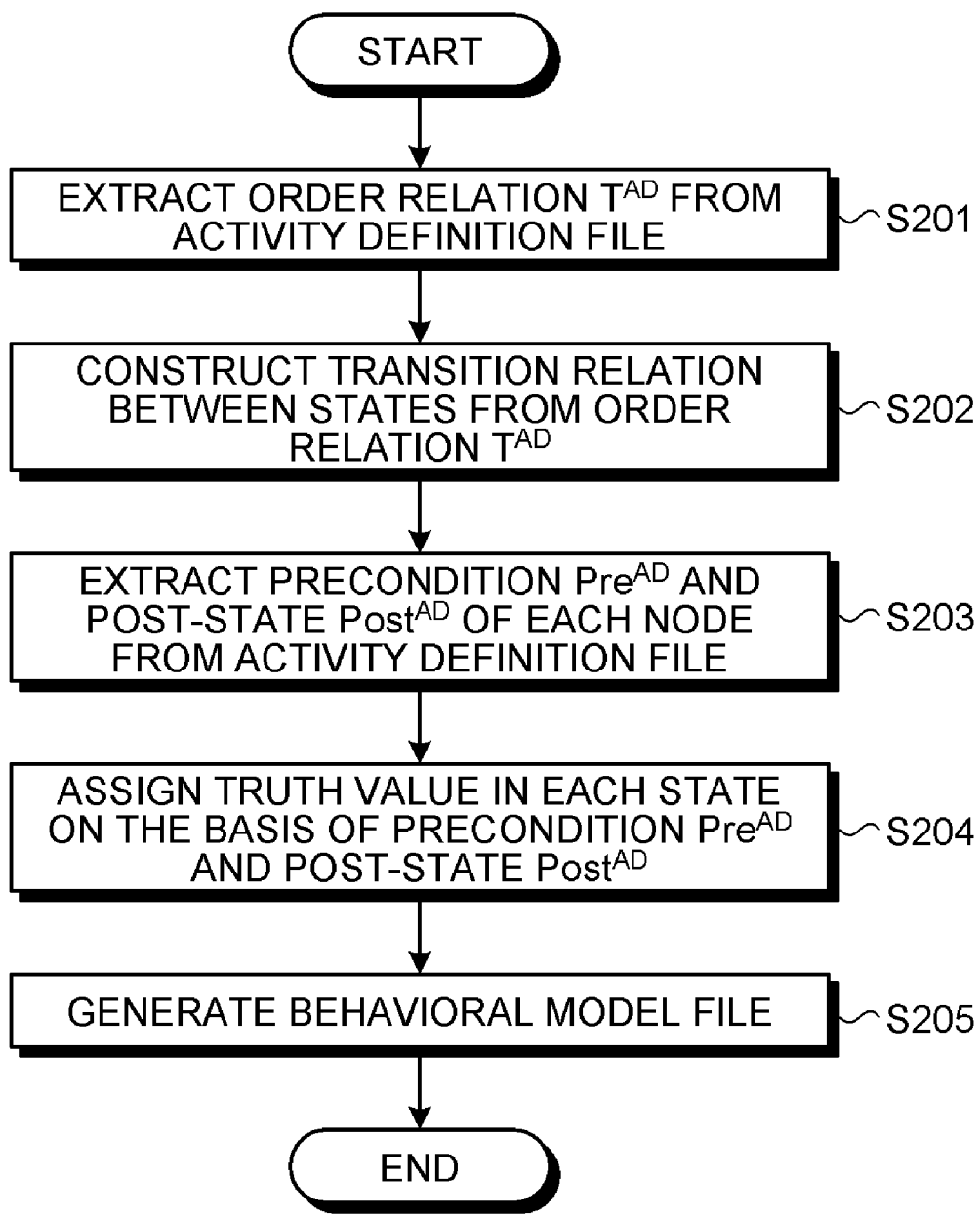

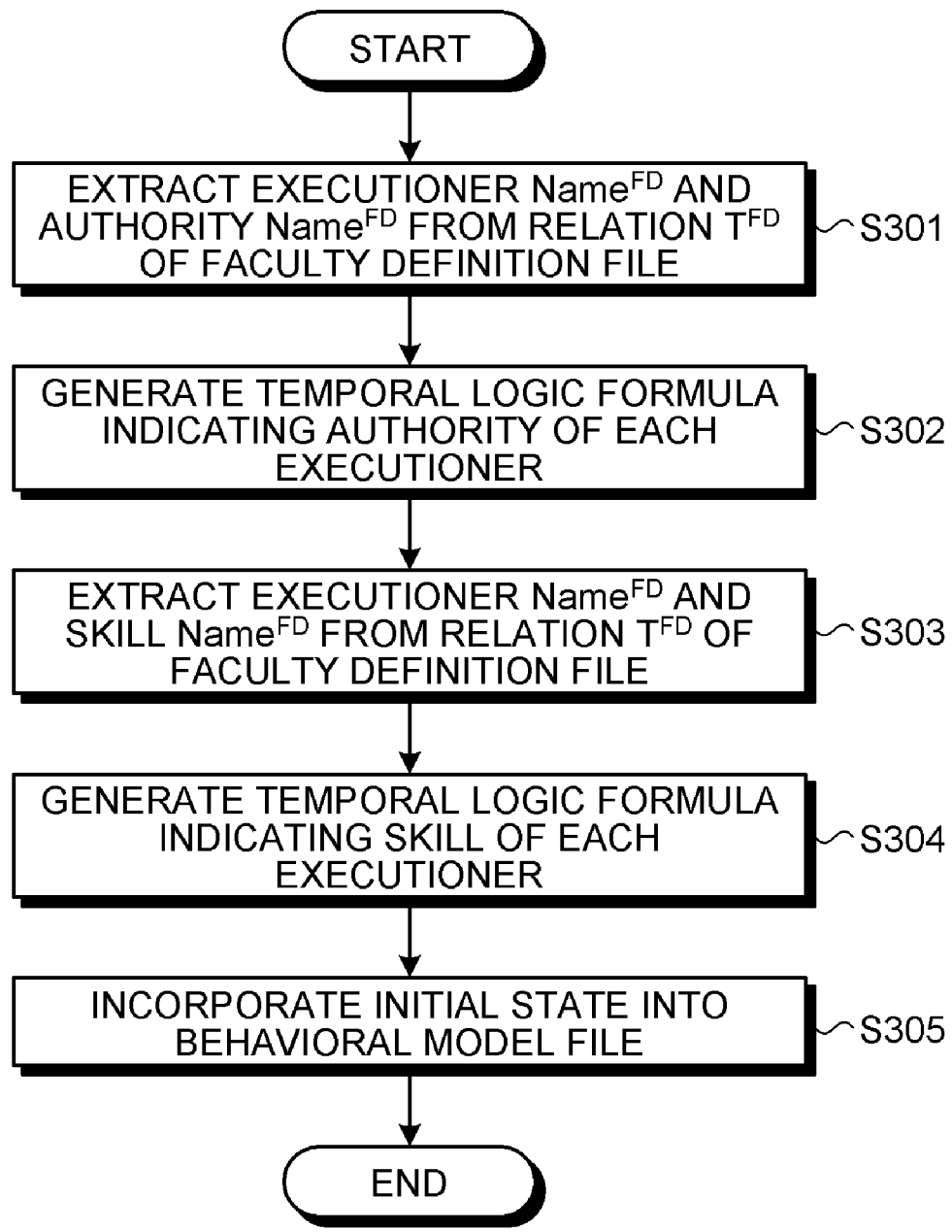

TEST FILE GENERATION DEVICE AND TEST FILE GENERATION METHOD

CROSS-REFERENCE TO RELATED APPLICATION(S)

This application is a continuation of International Application No. PCT/JP2008/060071, filed on May 30, 2008, the entire contents of which are incorporated herein by reference.

FIELD

The embodiments discussed herein are directed to a test file generation device and a test file generation method.

BACKGROUND

When a system manager or the like performs a work (hereinafter, "work process") on an information system, it is general that the system manager has conventionally used an operational manual described with a natural language. For example, a work process for applying a patch to a server is performed by using an operational manual in which the procedure and rule of such a work is described.

However, because an information system has recently become large-scale and complicated, the procedure and rule requested by a work process also become complicated. This makes it difficult to investigate the validity of a work process manually and this complexity is now one reason to cause failure. Moreover, in regard to an information system that is becoming large-scale and complicated, a few people have fragmentary knowledge in many cases. The segmentalization of knowledge makes it difficult to grasp the behavior of the information system, and causes frequent failures. An information system has high significance as a system for supporting a life infrastructure, and thus it is strongly desired to improve the reliability of the operational management of the information system.

Therefore, a technology for mechanically testing the validity of a work process has been recently proposed. For example, there is proposed a technology for describing a work process by using a UML (Unified Modeling Language) diagram and testing whether such a UML diagram satisfies a predetermined constraint or rule. As for the examples of conventional technology, see Japanese Laid-open Patent Publication No. 2005-275749, and Toru Sasaki, Kozo Okano, and Shinji Kusumoto, "Consistency Management of UML Model Based on Constraint Rules and Repair Actions", Journal D of The Institute of Electronics, Information and Communication Engineers, Vol. J90-D, No. 4, pp. 1005-1013, 2007.

However, the conventional technology has a problem in that a consistency test can be performed on only a single UML diagram, and the constraint and rule to be satisfied between UML diagrams are not cyclopaedically tested when a work process is described with a plurality of UML diagrams. In an information system that is becoming large-scale and complicated, a work process is described by using a plurality of diagrams in many cases. Therefore, it is desired that a technology for cyclopaedically testing a work process described with a plurality of UML diagrams is realized.

Although it is possible to describe a work process by using a method (for example, programming language) that is easily analyzed by a computer to cyclopaedically perform a consistency test, it puts enormous burden on a system manager or the like. Moreover, a work process described with a method that is easily analyzed by a computer is generally hard for a human being to understand, and likely to cause failure against the intension of its creator.

SUMMARY

According to an aspect of an embodiment of the invention, a test file generation device for generating a test file for testing a consistency of a work process, includes a receiving unit that receives various types of definition information relating to various types of procedures included in the work process, execution sequence of the various types of procedures, a final goal that is a goal that is finally achieved in the work process, sub-goals that are goals that are achieved in the various types of procedures, a constrained condition that is observed when the various types of procedures are executed, an executioner who executes the various types of procedures, and an authority for determining a procedure that can be executed by the executioner, a definition file generating unit that generates a definition file on the basis of the various types of definition information received by the receiving unit, and a behavioral model generating unit that generates a test file that indicates a behavioral model when the work process is executed on the basis of the definition file generated by the definition file generating unit.

According to another aspect of an embodiment of the invention, a test file generation method in a test file generation device that generates a test file for testing a consistency of a work process, the test file generation method includes receiving various types of definition information relating to various types of procedures included in the work process, execution sequence of the various types of procedures, a final goal that is a goal that is finally achieved in the work process, sub-goals that are goals that are achieved in the various types of procedures, a constrained condition that is observed when the various types of procedures are executed, an executioner who executes the various types of procedures, and an authority for determining a procedure that can be executed by the executioner, generating a definition file on the basis of the various types of definition information received in the receiving, and generating a test file that indicates a behavioral model when the work process is executed on the basis of the definition file generated.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is a diagram illustrating an example of an activity definition file that is generated from the activity diagram illustrated in FIG. 3.

FIG. 6 is a diagram illustrating an example of a constrained condition file.

FIG. 7 is a diagram illustrating an example of a behavioral model file.

FIG. 8 is a diagram illustrating an example of an initial state that is incorporated into the behavioral model file.

FIG. 10 is a flowchart illustrating a consistency test processing procedure that is performed by the test file generation device.

FIG. 11 is a flowchart illustrating a behavioral model generation processing procedure that is performed by a behavioral model generating unit.

FIG. 12 is a flowchart illustrating an initial state incorporation processing procedure that is performed by the behavioral model generating unit.

DESCRIPTION OF EMBODIMENT(S)

Exemplary embodiments of a test file generation program, a test file generation device, and a test file generation method according to the present invention will be explained below in detail with reference to the accompanying drawings. A test file generation program, a test file generation device, and a test file generation method according to the present invention are not limited to the embodiments explained below.

First, it will be explained about the overview of a test file generation device according to the present embodiment. The test file generation device according to the present embodiment receives a goal that is achieved by a work process in the end, various types of procedures that are performed in a work process, and information related to the authority of an executioner who executes various types of procedures. Specifically, the goal, procedure, and information related to the authority of an executioner are input by a user by using a UML notation. Then, the test file generation device generates various types of definition files on the basis of the goal, procedure, and information related to the authority of an executioner, which are input. Next, the test file generation device generates a behavioral model file that indicates a behavioral model at the time of execution of a work process based on the generated definition files, and tests the consistency of the work process by using such a behavioral model file. As a result, the test file generation device according to the present embodiment can cyclopaedically test the validity of a work process by using a work process diagram that can be easily read by a user.

In the present specification, a diagram in which a goal is described is referred to as a "mission diagram", a diagram in which a procedure is described is referred to as an "activity diagram", and a diagram in which the authority of an executioner is described is referred to as a "faculty diagram".

Figure 1:
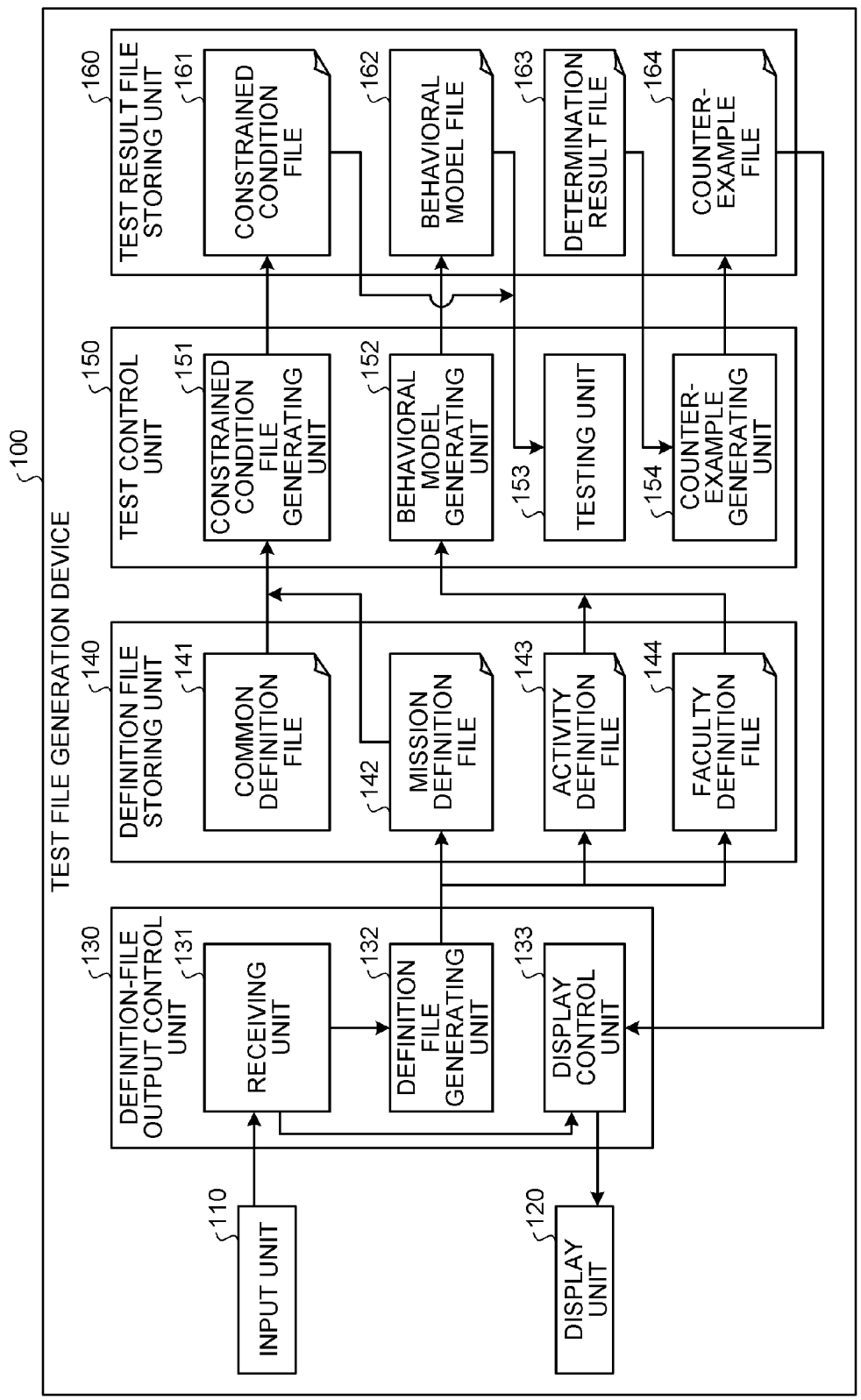
FIG. 1 is a diagram illustrating the configuration of a test file generation device according to a present embodiment.

It is specifically explained about a test file generation device with reference to FIG. 1. FIG. 1 is a diagram illustrating the configuration of a test file generation device 100 according to the present embodiment. As illustrated in FIG. 1, the test file generation device 100 includes an input unit 110, a display unit 120, a definition-file output control unit 130, a definition file storing unit 140, a test control unit 150 and a test result file storing unit 160.

The input unit 110 is an input device that inputs various types of information and operator guidance, and is, for example, a keyboard or a mouse. The display unit 120 is a display device that displays various types of information, and is, for example, a monitor.

A user who uses the test file generation device 100 according to the present embodiment can input a mission diagram, an activity diagram, and a faculty diagram by using a predetermined UML editor that is displayed on the display unit 120. An application for realizing the UML editor includes, as an example, a combination of "Eclipse" and "System Director Application Modeler UML Editor" that is the UML plug-in of Eclipse.

It will be explained about a description example of a mission diagram, an activity diagram, and a faculty diagram with reference to FIGS. 2 to 4. A work for adding a service server is illustrated as an example of work process. Specifically, such a work process sequentially performs procedures of checking whether any user use a server or not, obtaining the approval of a system manager, stopping a service, adding a service server, and finally restarting the service.

Figure 2:
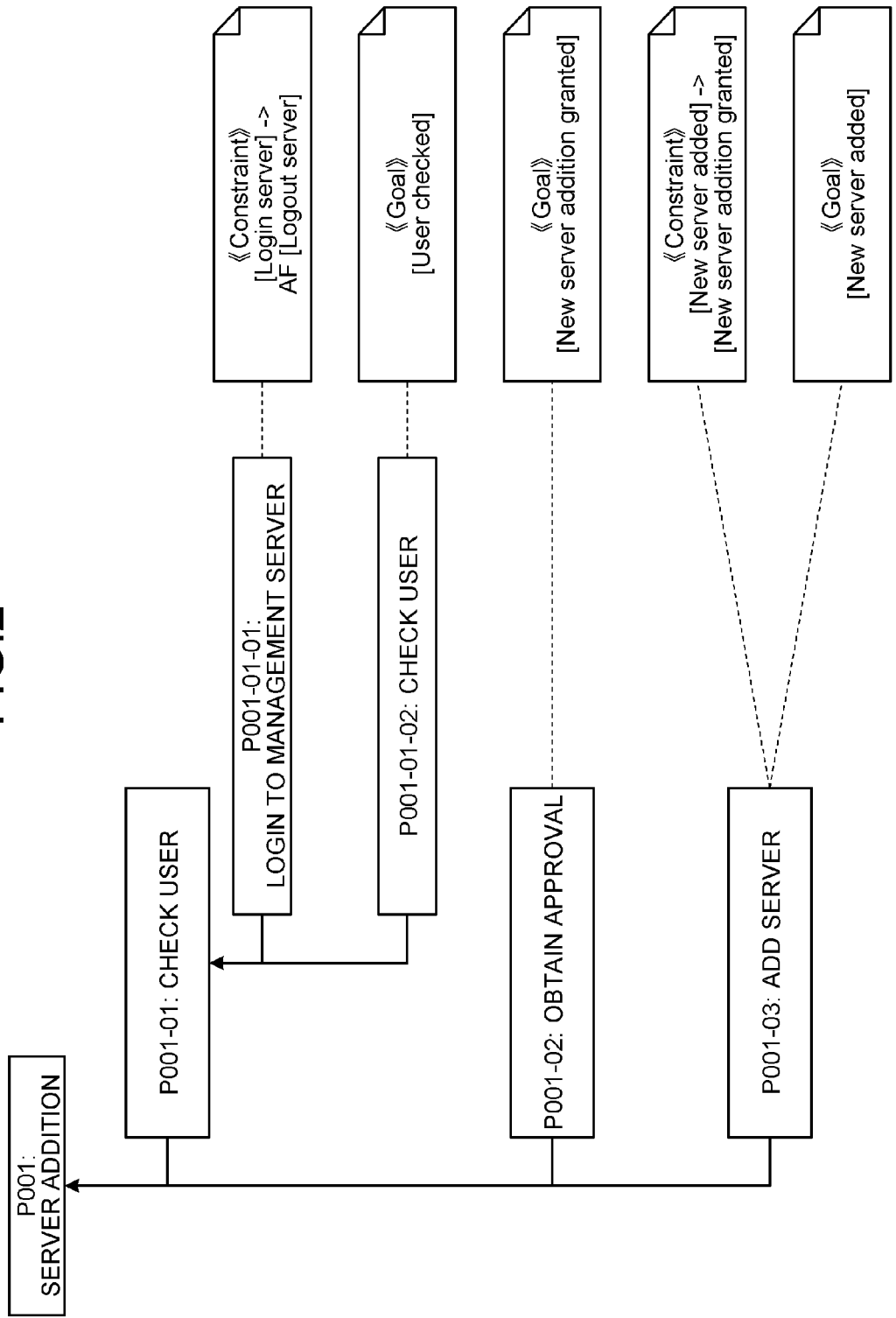
FIG. 2 is a diagram illustrating an example of a mission diagram.

FIG. 2 is a diagram illustrating an example of a mission diagram. As in an example illustrated in FIG. 2, a mission diagram is a diagram in which a goal achieved by a work process is described with a class diagram of UML. Specifically, a mission diagram is described with a goal (hereinafter, "final goal") that is finally achieved in a work process and a goal (hereinafter, "sub-goal") that is required to achieve the final goal.

Moreover, a mission diagram is described with a condition (hereinafter, "goal condition") that should be achieved by each sub-goal and a condition (hereinafter, "constrained condition") that is always satisfied while each sub-goal is being executed, in accordance with a temporal logic formula. Specifically, a goal condition is described in a rectangle in which a character string called "Goal" is described. A constrained condition is described in a rectangle in which a character string called "Constraint" is described.

In the mission diagram illustrated in FIG. 2, "P001: server addition" is described as a final goal. Moreover, "P001-01: check user", "P001-02: obtain approval", and "P001-03: add server" are described as sub-goals required to achieve the final goal. Moreover, "P001-01-01: login to management server" and "P001-01-02: check user" are described as sub-goals of the sub-goal "P001-01: check user".

Moreover, in the mission diagram illustrated in FIG. 2, [Login server]->AF[Logout server] is described as a constrained condition of the sub-goal "P001-01-01: login to management server". Such a constrained condition indicates that a user must certainly log out of a server after logging in to the server.

Moreover, [User checked] is described as a goal condition of the sub-goal "P001-01-02: check user". Such a goal condition shows that it is necessary to check whether a user that uses a server exists in order to achieve the sub-goal "P001-01-02: check user".

Moreover, [New server added] is described as a goal condition of the sub-goal "P001-03: add server". Such a goal condition shows that it is necessary to add a new server in order to achieve the sub-goal "P001-03: add server". Moreover, [New server added]->[New server addition granted] is described as a constrained condition of the sub-goal "P001-03: add server". Such a constrained condition shows that the approval of a system manager must be obtained when adding a server.

Figure 3:
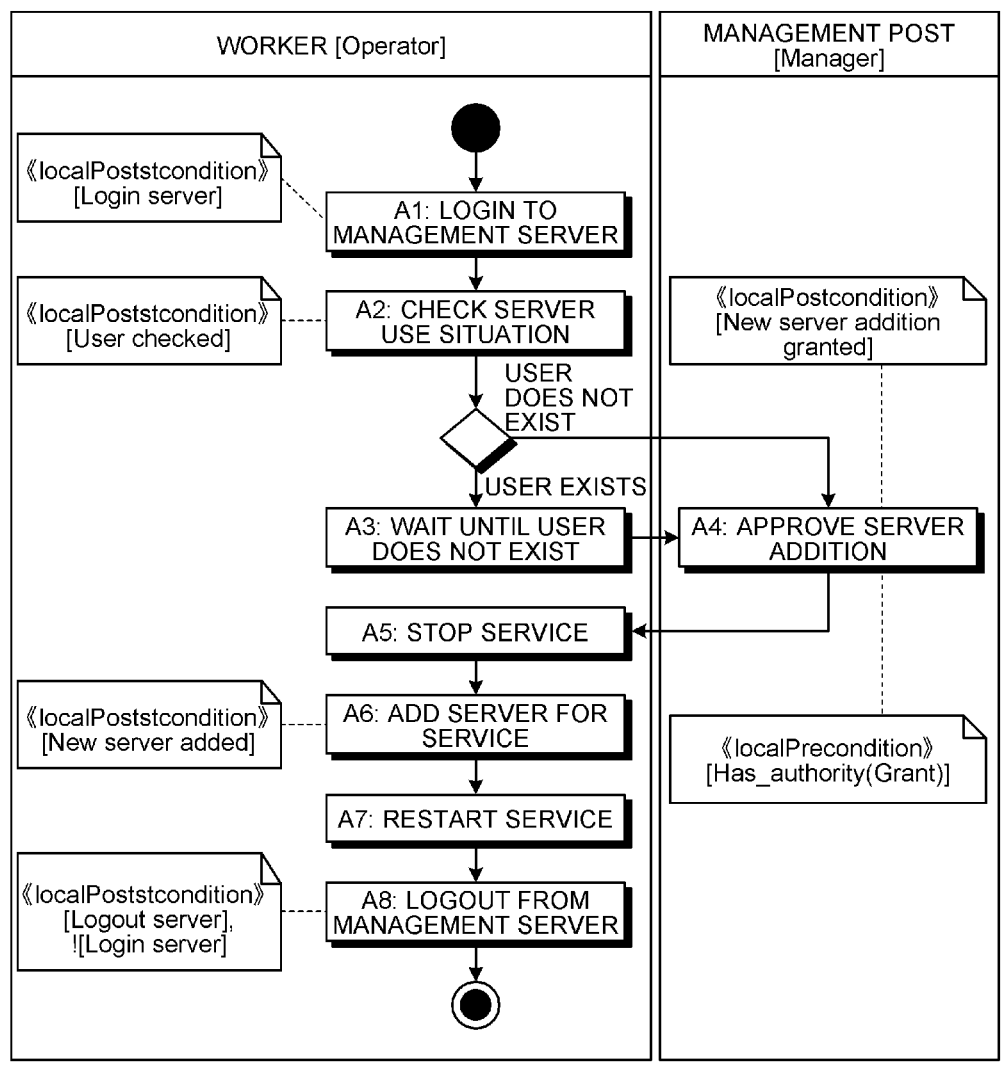
FIG. 3 is a diagram illustrating an example of an activity diagram.

FIG. 3 is a diagram illustrating an example of an activity diagram. As in an example illustrated in FIG. 3, an activity diagram is a diagram in which a procedure for achieving a final goal described in the mission diagram is described by the activity diagram of UML. Specifically, in the activity diagram, executioners of procedures are divided by activity partitions and the procedures executed by the executioners are described by coupling directed links.

Moreover, in the activity diagram, the precondition or postcondition of each procedure is described with a note (comment). Specifically, a precondition is described in a note in which a character string called "localPrecondition" is described and a postcondition is described in a note in which a character string called "localPostcondition" is described.

In an activity diagram illustrated in FIG. 3, a "worker [Operator]" and a "management post [Manager]" are described as activity partitions. Moreover, procedures A1 to A3 and A5 to A8 are described as procedures executed by an executioner "worker" and a procedure A4 is described as a procedure executed by an executioner "management post".

Moreover, in the activity diagram illustrated in FIG. 3, [Login server] is described as the postcondition of the procedure A1 "login to management server". Such a postcondition shows that worker [Operator] must remain logged in to the server after the procedure A1 is executed.

Moreover, [Has_authority(Grant)] is described as the precondition of the procedure A4 "approve server addition" and [New server addition granted] is described as the postcondition. Such a precondition shows that a subject (management post in the example of FIG. 3) who executes the procedure A4 must have an authority to give approval when the procedure A4 is executed. Moreover, such a postcondition shows that an approval must be obtained by a system manager after the procedure A4 is executed.

Figure 4:
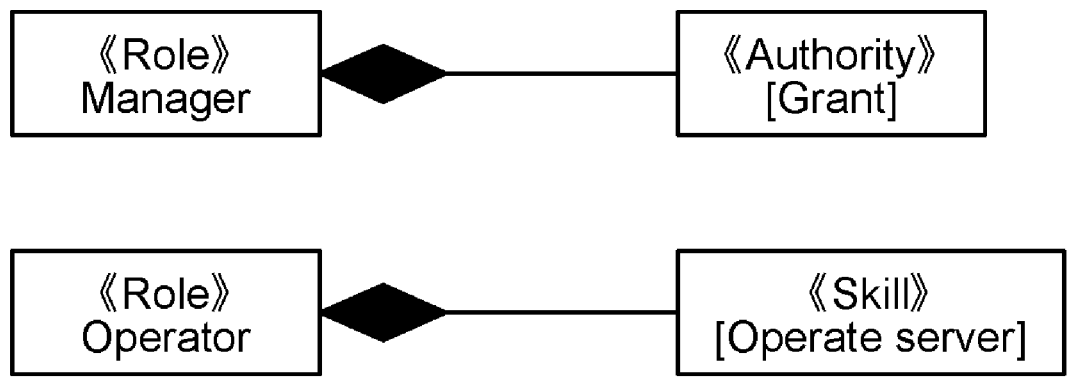
FIG. 4 is a diagram illustrating an example of a faculty diagram.

FIG. 4 is a diagram illustrating an example of a faculty diagram. As in an example illustrated in FIG. 4, a faculty diagram is a diagram in which executioners of the procedures described in the activity diagram and authorities and skills of the executioners are described by the class diagram of UML. Specifically, an executioner is described in a rectangle in which a character string called "Role" is described, an authority is described in a rectangle in which a character string called "Authority" is described, and a skill is described in a rectangle in which a character string called "Skill" is described The faculty diagram illustrated in FIG. 4 describes that an executioner "Manager (management post)" has authority [Grant] for approval. Moreover, the faculty diagram describes that an executioner "Operator (worker)" has a skill [Operate server] for operating a server.

The definition-file output control unit 130 illustrated in FIG. 1 is a control unit that outputs various types of definition files to the definition file storing unit 140. The definition-file output control unit 130 includes a receiving unit 131, a definition file generating unit 132, and a display control unit 133.

The receiving unit 131 is a processing unit that receives various types of information and operator guidance input by the input unit 110. Specifically, the receiving unit 131 receives information input to create or edit a mission diagram and the like, and outputs the received information to the definition file generating unit 132 and the display control unit 133. Moreover, the receiving unit 131 instructs the definition file generating unit 132 to start a consistency test when an operator guidance for starting the consistency test of a work process is given by a user.

The definition file generating unit 132 is a processing unit that generates various types of definition files on the basis of the information input from the receiving unit 131 when receiving the instruction of starting the consistency test from the receiving unit 131. Specifically, the definition file generating unit 132 generates a mission definition file 142 having an XMI (XML (Extensible Markup Language) Metadata Interchange) format on the basis of the information input by the input unit 110 to create a mission diagram.

Moreover, the definition file generating unit 132 generates an activity definition file 143 having the XMI format on the basis of the information input by the input unit 110 to create an activity diagram. FIG. 5 illustrates an example of the activity definition file 143 that is generated from the activity diagram illustrated in FIG. 3. Moreover, the definition file generating unit 132 generates a faculty definition file 144 having the XMI format on the basis of the information input by the input unit 110 to create a faculty diagram.

A UML editor that is realized by the UML plug-in of Eclipse has a function for generating a file having an XMI format from a UML diagram. Therefore, a definition file generation process that is performed by the definition file generating unit 132 can be realized by an existing application.

The display control unit 133 is a control unit that makes the display unit 120 display various types of information. For example, when information input to create or edit a mission diagram and the like is input from the receiving unit 131, the display control unit 133 makes the display unit 120 display the information.

The definition file storing unit 140 is a storage device that stores various types of definition files. The definition file storing unit 140 stores therein a common definition file 141, the mission definition file 142, the activity definition file 143, and the faculty definition file 144.

The common definition file 141 is a file in which common rules are described when testing all work processes. For example, the common definition file 141 describes therein rules called "a start node exists in a work process" and "an end node exists in a work process".

The test control unit 150 is a control unit that tests the consistency of a work process on the basis of various types of definition files stored in the definition file storing unit 140. The test control unit 150 includes a constrained condition file generating unit 151, a behavioral model generating unit 152, a testing unit 153, and a counterexample generating unit 154.

The constrained condition file generating unit 151 is a processing unit that generates a constrained condition file 161 on the basis of the common definition file 141 and the mission definition file 142. The constrained condition file 161 is a file in which a goal condition and a constrained condition that must be satisfied by each procedure are described by a CTL (Computational Tree Logic) expression.

Now, it is specifically explained about a process in which the constrained condition file generating unit 151 generates the constrained condition file 161 on the basis of the mission definition file 142. First, it is explained about a logical data structure of a mission diagram. Next, it will be explained about a generation process of the constrained condition file 161 that is performed by the constrained condition file generating unit 151.

First, it will be explained about a logical data structure of a mission diagram. The components of a mission diagram MD are defined by the following data structure (1).

$$MD = (N^{MD}, T^{MD}) \qquad (1)$$

In the data structure (1), $N^{MD}$ indicates a set of nodes $n^{MD}$ described in the mission diagram MD. In this case, the "nodes $n^{MD}$" indicate a final goal and a sub-goal that are described in the mission diagram MD.

Moreover, the nodes $n^{MD}$ is defined by the following data structure (2).

$$n^{MD}=<Name^{MD}, Type^{MD}, Cont^{MD}> \quad (2)$$

In the data structure (2), $Name^{MD}$ indicates the name of the node $n^{MD}$. $Type^{MD}$ indicates the type of the node $n^{MD}$. $Cont^{MD}$ indicates the contents of a goal condition or a constrained condition and is indicated by a temporal logic formula. Specifically, when the $Type^{MD}$ of a node $n^{MD}$ is "Goal", a goal condition is set in the $Cont^{MD}$ of the node $n^{MD}$. Moreover, when the $Type^{MD}$ or a node $n^{MD}$ is "Constraint", a constrained condition is set in the $Cont^{MD}$ of the node $n^{MD}$.

The $T^{MD}$ indicates a set of connection relations $t^{MD}$ between the nodes $n^{MD}$ included in the node set $N^{MD}$. The connection relation $t^{MD}$ is, for example, defined by a data structure called $<n1^{MD}, n2^{MD}>$. Such a data structure shows that a node $n1^{MD}$ and a node $n2^{MD}$ are connected.

Because the mission definition file 142 is a file having an XMI format that indicates the mission diagram MD, the mission definition file 142 is also defined like the data structures (1) and (2).

Next, it will be explained about a process in which the constrained condition file generating unit 151 generates the constrained condition file 161 on the basis of the mission definition file 142. First, the constrained condition file generating unit 151 extracts $Cont^{MD}$ that indicates a goal condition or a constrained condition from the node set $N^{MD}$ of the mission definition file 142. Next, the constrained condition file generating unit 151 generates a CTL formula indicating a constrained condition that must be always satisfied while the node $n^{MD}$ is being executed, on the basis of $Cont^{MD}$ of which $Type^{MD}$ is "Constraint" among the extracted $Cont^{MD}$. Specifically, the constrained condition file generating unit 151 generates AG($Cont^{MD}$) as the CTL formula.

Next, the constrained condition file generating unit 151 generates a CTL formula indicating a goal condition that must be satisfied after the node $n^{MD}$ is executed, on the basis of $Cont^{MD}$ of which $Type^{MD}$ is "Goal" among the extracted $Cont^{MD}$. Specifically, the constrained condition file generating unit 151 generates AG(Final->$Cont^{MD}$) as the CTL formula.

Then, the constrained condition file generating unit 151 generates the constrained condition file 161 in which a goal condition and a constrained condition expressed by the CTL formula are described. FIG. 6 is a diagram illustrating an example of the constrained condition file 161. In the constrained condition file 161 illustrated in FIG. 6, "AG(EF[Final])" indicates, for example, a condition that "a state can move from all states to a state arriving at ActivityFinalNode. Moreover, for example, "AG(!Precondtion_error)" indicates a condition that "precondition violation does not occur in all states during executing activity".

The behavioral model generating unit 152 illustrated in FIG. 1 is a processing unit that generates a behavioral model when executing a work process on the basis of the activity definition file 143. Specifically, the behavioral model generating unit 152 generates, as a behavioral model, a behavioral model file 162 having a format that can be processed by the testing unit 153 to be described below. In this case, the test file generation device 100 according to the present embodiment uses NuSMV that is a model testing tool as the testing unit 153. Therefore, the behavioral model generating unit 152 generates the behavioral model file 162 having an SMV format.

Moreover, the behavioral model generating unit 152 generates an initial state of a behavioral model on the basis of the faculty definition file 144, and incorporates the generated initial state into the behavioral model file 162. The term "initial state" indicates an event that is realized before a work process is executed, and indicates, for example, the authority of an executioner.

Now, it is specifically explained about a generation process of the behavioral model file 162 and an initial state incorporation process that are performed by the behavioral model generating unit 152. First, it is explained about the logical data structure of an activity diagram. Next, it is explained about the logical data structure of a faculty diagram. Next, it is explained about the logical data structure of a behavioral model. Next, it will be explained about a generation process of the behavioral model file 162 that is performed by the behavioral model generating unit 152.

First, it will be explained about the logical data structure of an activity diagram. The components of an activity diagram AD are defined by the following data structure (3).

$$AD=(P^{AD}, N^{AD}, T^{AD}) \quad (3)$$

In the data structure (3), $P^{AD}$ indicates a set of partitions $p^{AD}$ described in the activity diagram AD. $N^{AD}$ indicates a set of nodes $n^{AD}$ described in the activity diagram AD. The term "node $n^{AD}$" indicates a procedure and a note included in the activity diagram AD. $T^{AD}$ indicates a set of order relations $t^{AD}$ between the nodes $n^{AD}$ included in the node set $N^{AD}$.

Moreover, the partition $p^{AD}$ is defined by the following data structure (4).

$$p^{AD}=<Name^{AD}, Role^{AD}> \quad (4)$$

In the data structure (4), $Name^{AD}$ indicates the name of the partition $p^{AD}$. $Role^{AD}$ indicates the role, authority, and skill of the partition $p^{AD}$. In the example of the activity diagram illustrated in FIG. 3, a partition $p^{AD}$ of which $Name^{AD}$ is "worker" and $Role^{AD}$ is "Operator" and a partition $p^{AD}$ of which $Name^{AD}$ is "management post" and $Role^{AD}$ is "Manager" are defined.

Moreover, the order relation $t^{AD}$ is defined by the following data structure (5).

$$t^{AD}=<Src^{AD}, Dst^{AD}, Relation^{AD}> \quad (5)$$

In the data structure (5), $Src^{AD}$ indicates a node that becomes the starting point of the order relation $t^{AD}$. $Dst^{AD}$ indicates a node that becomes the ending point of the order relation $t^{AD}$. $Relation^{AD}$ indicates a relationship between the starting-point node $Src^{AD}$ and the ending-point node $Dst^{AD}$. Specifically, "ControlFlow" or "CommentLine" is set in the $Relation^{AD}$.

Moreover, the node $n^{AD}$ is defined by the following data structure (6).

$$n^{AD}=<Name^{AD}, Type^{AD}, Pre^{AD}, Post^{AD}> \quad (6)$$

In the data structure (6), $Name^{AD}$ indicates the action name of the node $n^{AD}$. $Type^{AD}$ indicates the type or stereotype of the node $n^{AD}$. Moreover, one of "ExecutableNode", "InitialNode", "ActivityFinalNode", "ForkNode", "JoinNode", "MergeNode", "DecisionNode", "localPrecondition", "localPostcondition" is set in the $Type^{AD}$ in accordance with the description specification of UML2.0.

For example, when $Type^{AD}$ is "ExecutableNode", "login to server", "execute approval process", or the like is set in the $Name^{AD}$. Moreover, for example, when $Type^{AD}$ is a stereotype such as "localPrecondition" or "localPostcondition", a logical expression indicating the precondition or postcondition of an action is set in the $Name^{AD}$.

$Pre^{AD}$ indicates a precondition that must be satisfied before executing the action of the node $n^{AD}$. Specifically, when $Type^{AD}$ of the node $n^{AD}$ is "ExecutableNode", the precondition $Pre^{AD}$ of the node $n^{AD}$ is indicated by a node $n^{AD}$ that is connected to the node $n^{AD}$ and whose $Type^{AD}$ is "localPrecondition". In other words, in two nodes $n1^{AD}$ and $n2^{AD}$, if "$Type1^{AD}$=ExecutableNode", "$Type2^{AD}$=localPrecondition", and "<$n1^{AD}$, $n2^{AD}$, CommentLine>$\epsilon T^{AD}$", "$Pre1^{AD}$=$Name2^{AD}$" is realized.

$Post^{AD}$ indicates a postcondition after the action of the node $n^{AD}$ is executed. Specifically, when the $Type^{AD}$ of the node $n^{AD}$ is "ExecutableNode", the postcondition $Post^{AD}$ of the node $n^{AD}$ is indicated by a node $n^{AD}$ that is connected to the node $n^{AD}$ and whose $Type^{AD}$ is "localPostcondition".

Because the activity definition file 143 is a file having an XMI format that indicates the activity diagram AD, the activity definition file 143 is also defined like the data structures (3) to (6).

Next, it will be explained about the logical data structure of a faculty diagram. The components of a faculty diagram FD is defined by the following data structure (7).

$$FD=(N^{FD}, T^{FD}) \quad (7)$$

In the data structure (7), $N^{FD}$ indicates a set of nodes $n^{FD}$ described in the faculty diagram FD. Moreover, the term "node $n^{FD}$" indicates the executioner, authority, and skill described in the faculty diagram FD. $T^{FD}$ indicates a set of relationships $t^{FD}$ between the nodes $n^{FD}$ included in the node set $N^{FD}$.

Moreover, the node $n^{FD}$ is defined by the following data structure (8).

$$n^{FD}=<Name^{FD}, Type^{FD}> \quad (8)$$

In the data structure (8), $Name^{FD}$ indicates the name of the executioner, authority, or skill expressed with the node $n^{FD}$. $Type^{FD}$ indicates the stereotype of the node $n^{FD}$. Specifically, when the node $n^{FD}$ is an executioner, "Role" is set in the $Type^{FD}$. When the node $n^{FD}$ is authority, "Authority" is set in the $Type^{FD}$. When the node $n^{FD}$ is a skill, "Skill" is set in the $Type^{FD}$.

In the example of the faculty diagram illustrated in FIG. 4, a node $n1^{FD}$ of which $Name^{FD}$ is "Manager" and $Type^{FD}$ is "Role" and a node $n2^{FD}$ of which $Name^{FD}$ is "Grant" and $Type^{FD}$ is "Authority" are defined. Moreover, the relationship between the node $n1^{FD}$ and the node $n2^{FD}$ is defined by a predetermined relationship $t1^{FD}$. Therefore, it is possible to grasp that the executioner "Manager" has authority "Grant" by using the nodes $n1^{FD}$ and $n2^{FD}$ and the relationship $t1^{FD}$.

Similarly, in the example of the faculty diagram illustrated in FIG. 4, a node $n3^{FD}$ of which $Name^{FD}$ is "Operator" and $Type^{FD}$ is "Role" and a node $n4^{FD}$ of which $Name^{FD}$ is "Operate server" and $Type^{FD}$ is "Skill" are defined. Moreover, the relationship between the node $n3^{FD}$ and the node $n4^{FD}$ is defined by a predetermined relationship $t2^{FD}$. Therefore, it is possible to grasp that the executioner "Operator" has a skill "Operate server" by using the nodes $n3^{FD}$ and $n4^{FD}$ and the relationship $t2^{FD}$.

Because the faculty definition file 144 is a file having an XMI format that indicates the faculty diagram FD, the faculty definition file 144 is defined like the data structures (7) and (8).

Next, it will be explained about the logical data structure of a behavioral model that is generated from the behavioral model generating unit 152. A behavioral model $M_{AD}$ is defined by the following expression (9).

$$M_{AD}=(S, SI, R, L) \quad (9)$$

In the data structure (9), "S" indicates a set of reachable states "s" in the activity diagram AD. The term "reachable state" indicates a state before a predetermined procedure is executed, a state where a predetermined procedure is being executed, and a state after a predetermined procedure is executed, in the activity diagram AD. In the example of the activity diagram illustrated in FIG. 3, a state before the procedures A1 to A8 are executed, a state where the procedures A1 to A8 are being executed, and a state after the procedures A1 to A8 are executed are included in the "S".

"SI" is an element included in the state set "S" and indicates an initial state in the activity diagram AD. In the example of the activity diagram illustrated in FIG. 3, the "SI" indicates a state before the procedure A1 is executed.

"L" is a function for giving a mapping from the state "s" to a variable that indicates an event realized in the state "s". The term "variable indicating event" is, for example, defined by the following (A) to (D).

(A) IN(n)

When an action expressed by the node nAD is being executed in the state "s", a variable IN(n) indicates the multiplicity of the execution. For example, when the state "s" is not being executed, IN(n)=0 is accomplished.

(B) ON(t)

The "t" of a variable ON(t) is defined by the following expression.

$$t=<n1^{AD}, n2^{AD}, ControlFlow> \quad (10)$$

In the Expression (10), a node $n1^{AD}$ indicates an action just before the state "s" and a node $n2^{AD}$ indicates an action just after the state "s". Moreover, when an action expressed by the node $n1^{AD}$ is terminated and an action expressed by the node $n2^{AD}$ is in a state before the execution, the ON(t) indicates the multiplicity of the execution.

(C) Has_authority(x,y)  (11)

In the Expression (11), "x" indicates an authority and "y" indicates an executioner. For example, when it is described in the faculty definition file 144 that the executioner "y" has the authority "x", "Has_authority(x, y)=1 (true)" is accomplished in all the states "s". A variable indicating whether the executioner "y" has a skill "x" is indicated by "Has_skill(x, y)".

(D) Final

The "Final" indicates that an activity is terminated by arriving at an action indicated by FinalNode in the activity diagram AD. Specifically, in the case of "$Type^{AD}$=FinalNode", the state "s|=Final" is accomplished if it is the state "s|=In($n^{AD}$)".

The variables indicated in (A) to (D) are only an example. Interpretation in each state "s" can be also given to other variables described in the activity diagram AD and the mission diagram MD. Hereinafter, it is assumed that a function indicating the value of a variable "v" in the state "s" decided by a function "L" is expressed by "f(L(s), v)".

"R" indicates a condition of transiting from a predetermined state "s1" to another state "s2". Hereinafter, it will be explained about a transition condition R of transiting from the state "s1" to the state "s2" by using two examples. First, it will be explained about a transition condition R1 of transiting from the state "s1" where an action expressed with the node $n1^{AD}$ is being executed to the state "s2" after the execution of the action is terminated. The transition condition R1 defines conditions R1-1 to R1-7 that are shown below.

Condition R1-1

"f(L(s1), IN($n1^{AD}$))>0" is accomplished.

Condition R1-2

"$T_{OUT}$={$t2^{AD}$|$t2^{AD}$=<$n1^{AD}$, $Dst2^{AD}$, ControlFlow>$\epsilon T$}" is not empty. In other words, there is at least one ControlFlow in which the node $n1^{AD}$ is a starting-point node.

Condition R1-3

In the case of "$T_{OUT}=\{d_1, d_2, \ldots, d_m\}$", "$f(L(s2), ON(d_k))=f(L(s1), ON(d_k))+1$" is accomplished about a predetermined one "k" ($1 \leq k \leq m$) if it is "$Type1^{AD} \neq ForkNode$". If it is "$k \neq 1$", "$f(L(s2), ON(d_1))=f(L(s1), ON(d_1))$" is accomplished.

Condition R1-4

In the case of "$T_{OUT}=\{d_1, d_2, \ldots, d_m\}$", "$f(L(s2), ON(d_k))=f(L(s1), ON(d_k))+1$" is accomplished about all "k" ($1 \leq k \leq m$) if it is "$Type1^{AD}=ForkNode$".

Condition R1-5

"$f(L(s2), IN(n1^{AD}))=f(L(s1), IN(n1^{AD}))-1$" is accomplished.

Condition R1-6

About a predetermined proposition α, "$f(L(s2), α)=1$ (true)" is accomplished if it is "$α \epsilon Post1^{AD}$" and "$f(L(s2), α)=0$ (false)" is accomplished if it is "$\neg α \epsilon Post1^{AD}$".

Condition R1-7

In the conditions R1-1 to R1-6, "$f(L(s1), x)=f(L(s2), x)$" is accomplished about undesignated variables and proposition "x".

Next, it will be explained about a transition condition R2 of transiting from the predetermined state "s1" to the state "s2" where the action expressed with the node $n1^{AD}$ is being executed. The transition condition R2 defines conditions R2-1 to R2-6 that are shown below.

Condition R2-1

"$T_{IN}=\{t1^{AD}|t1^{AD}=<n2^{AD}, n1^{AD}, ControlFlow> \epsilon T\}$" is not empty. In other words, there is at least one ControlFlow in which the node $n2^{AD}$ is an ending-point node.

Condition R2-2

In the case of "$T_{IN}=\{e_1, e_2, \ldots, e_m\}$", "$f(L(s1), ON(e_k))>0$" and "$f(L(s2), ON(e_k))=f(L(s1), ON(e_k))-1$" are accomplished about a predetermined one "k" ($1 \leq k \leq m$) if it is "$Type1^{AD} \neq ForkNode$". If it is "$k \neq 1$", "$f(L(s2), ON(e_1))=f(L(s1), ON(e_2))$" is accomplished.

Condition R2-3

In the case of "$T_{IN}=\{e_1, e_2, \ldots, e_m\}$", "$f(L(s1), ON(e_k))>0$" and "$f(L(s2), ON(e_k))=f(L(s1), ON(e_k))-1$" are accomplished about all "k" ($1 \leq k \leq m$) if it is "$Type1^{AD}=ForkNode$".

Condition R2-4

"$f(L(s2), IN(n1^{AD}))=f(L(s1), IN(n1^{AD}))+1$" is accomplished.

Condition R2-5

About a predetermined proposition α, "$f(L(s1), α)=1$ (true)" is accomplished if it is "$α \epsilon Pre1^{AD}$" and "$f(L(s1), α)=0$ (false)" is accomplished if it is "$\neg α \epsilon Pre1^{AD}$".

Condition R2-6

In the conditions R2-1 to R2-6, "$f(L(s1), x)=f(L(s2), x)$" is accomplished about undesignated variables and proposition "x".

Now, it will be explained about a generation process of the behavioral model file 162 that is performed by the behavioral model generating unit 152. The behavioral model generating unit 152 extracts an order relation $T^{AD}$ from the activity definition file 143. Next, the behavioral model generating unit 152 constructs a transition relation between the states "s" from the extracted order relation $T^{AD}$. Next, the behavioral model generating unit 152 extracts the precondition $Pre^{AD}$ and post-state $Post^{AD}$ of each the node $n^{AD}$ from the activity definition file 143. Next, the behavioral model generating unit 152 assigns a truth value in each state "s" and generates the behavioral model file 162 on the basis of the precondition $Pre^{AD}$ and the post-state $Post^{AD}$.

FIG. 7 is a diagram illustrating an example of the behavioral model file 162 having an SMV format. In the behavioral model file 162 illustrated in FIG. 7, "in__0__1" indicates that the procedure A2 illustrated in FIG. 3 is being executed and "on__6" indicates that the execution is terminated up to a link just before the procedure A2. In other words, when the procedure A2 transits to a state to be executed, the behavioral model file 162 illustrated in FIG. 7 indicates that "1" is subtracted from "on__6", "1" is added to "in__0__1", and the value of "User_checked" is 1 (true).

Next, it will be explained about an initial state incorporation process that is performed by the behavioral model generating unit 152. The behavioral model generating unit 152 extracts a relationship between $Name1^{FD}$ of the executioner of which $Type^{FD}$ is "Role" and $Name2^{FD}$ of the authority of which $Type^{FD}$ is "Authority" on the basis of a relation $T^{FD}$ of the faculty definition file 144. Next, the behavioral model generating unit 152 generates a temporal logic formula that indicates that the extracted executioner $Name1^{FD}$ has the extracted authority $Name2^{FD}$. Specifically, the behavioral model generating unit 152 generates Has_autority($Name1^{FD}$, $Name2^{FD}$) as a temporal logic formula.

Next, the behavioral model generating unit 152 extracts a relationship between $Name3^{FD}$ of the executioner of which $Type^{FD}$ is "Role" and $Name4^{FD}$ of the authority of which $Type^{FD}$ is "Skill" on the basis of the relation $T^{FD}$ of the faculty definition file 144. Next, the behavioral model generating unit 152 generates a temporal logic formula that indicates that the extracted executioner $Name3^{FD}$ has the extracted skill $Name4^{FD}$. Specifically, the behavioral model generating unit 152 generates Has_skill($Name3^{FD}$, $Name4^{FD}$) as a temporal logic formula.

FIG. 8 is a diagram illustrating an example of an initial state that is incorporated into the behavioral model file 162. For example, a definition 81 of FIG. 8 indicates that "management post has approval authority". The behavioral model generating unit 152 incorporates an initial state that is defined in this way into the behavioral model file 162. On the other hand, the behavioral model generating unit 152 may generate another file of which the initial state is defined without incorporating an initial state into the behavioral model file 162.

The testing unit 153 is a processing unit that tests whether the consistency of a work process is satisfied on the basis of the constrained condition file 161 and the behavioral model file 162. Specifically, the testing unit 153 tests whether each procedure is executed by an executioner having authority or skill, whether each procedure is executed while satisfying the constrained condition that is defined in the constrained condition file 161, and whether the goal condition that is defined in the constrained condition file 161 is satisfied. Then, when the consistency of a work process is not satisfied, the testing unit 153 generates a determination result file 163. In this case, NuSMV has a function for generating the determination result file 163, and the determination result file 163 is a file having a text format.

The counterexample generating unit 154 is a processing unit that generates a counterexample file 164 having an XMI format from the determination result file 163 having a text format that is generated by the testing unit 153. Specifically, the counterexample generating unit 154 generates the counterexample file 164 having an XMI format in such a manner that a procedure of which the consistency is not satisfied can be visually grasped. For example, the counterexample generating unit 154 generates the counterexample file 164 in such a manner that the display color of a procedure that causes the unsatisfaction of consistency is changed to the display color of the other procedure.

Figure 9A:
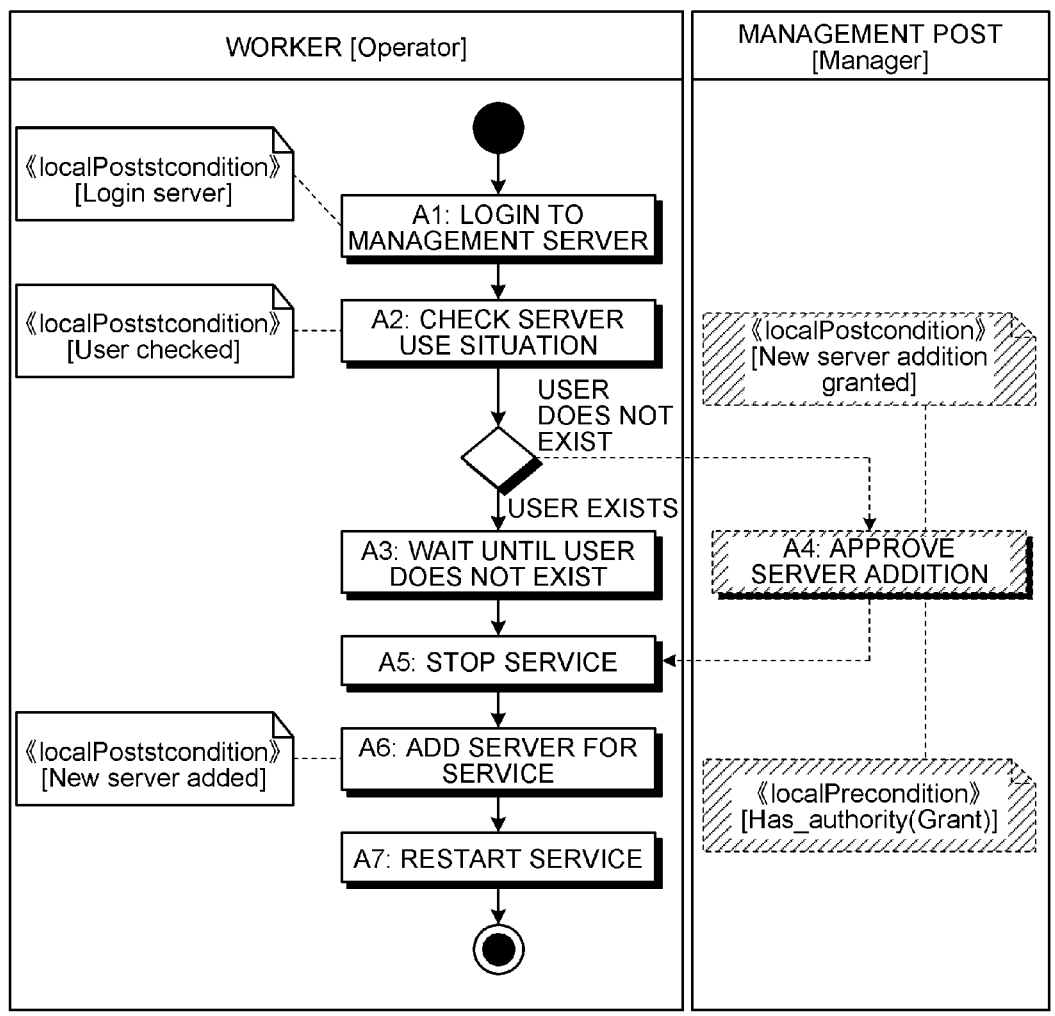
FIG. 9A is a diagram illustrating an example of a consistency test result screen.
Figure 9B:
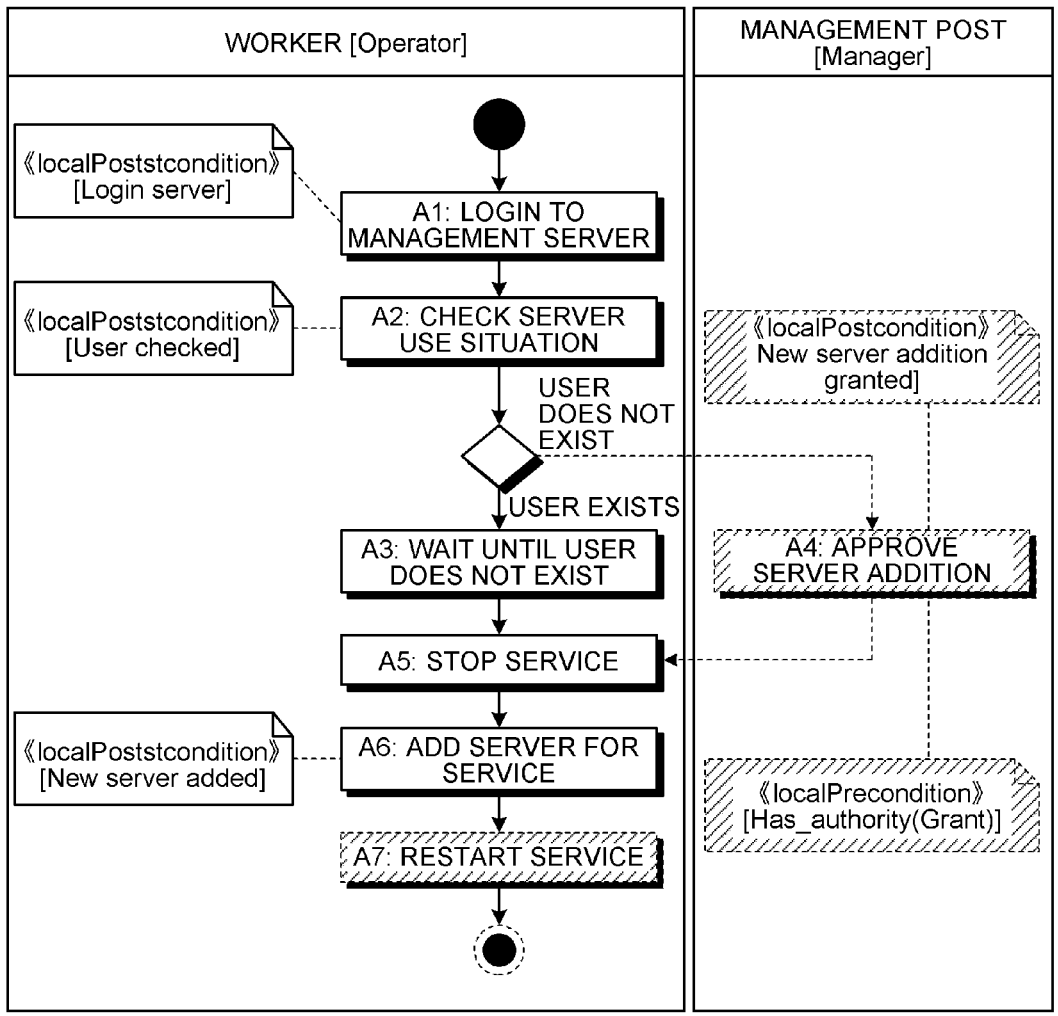
FIG. 9B is a diagram illustrating an example of a consistency test result screen.
Figure 9C:
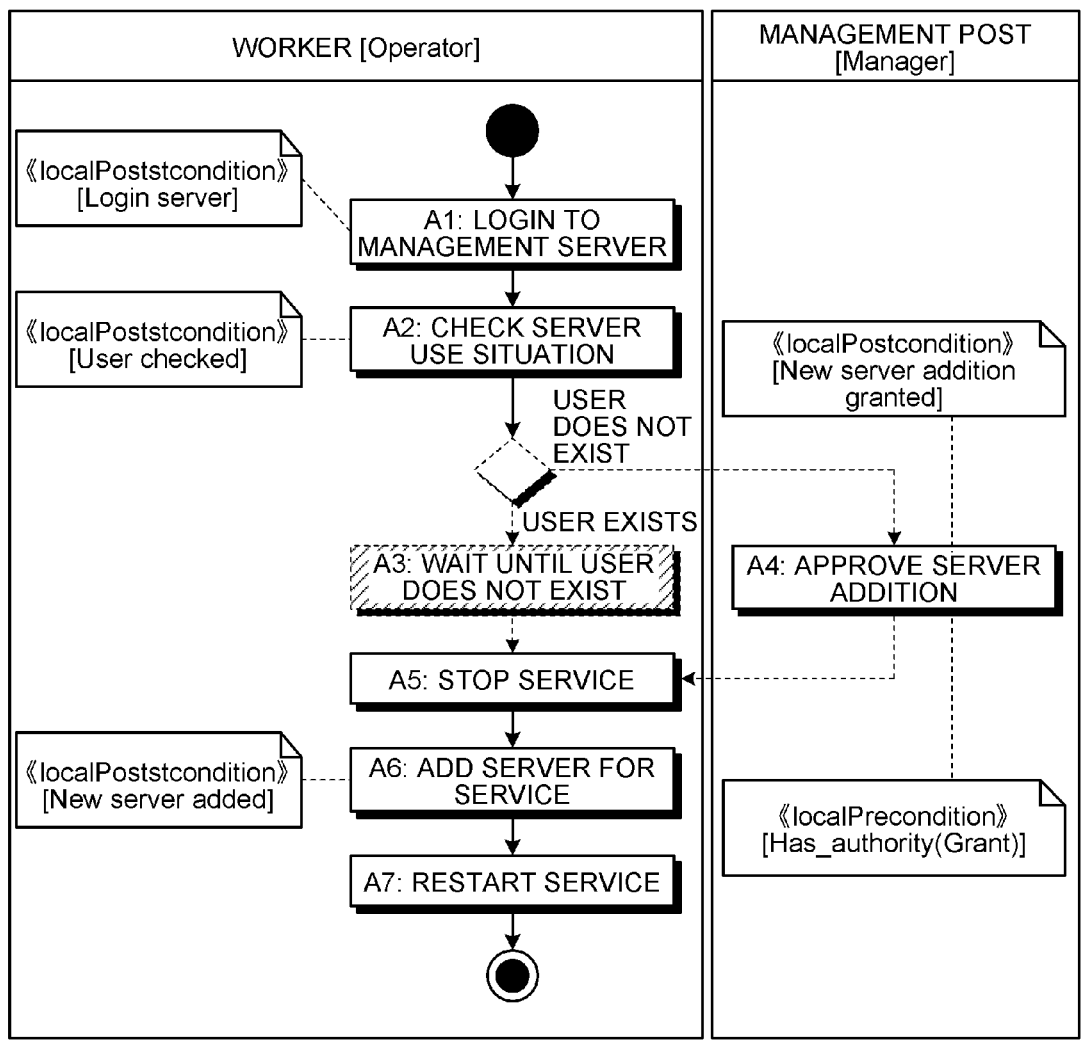
FIG. 9C is a diagram illustrating an example of a consistency test result screen.

Then, the counterexample generating unit 154 outputs the generated counterexample file 164 to the display control unit 133. The display control unit 133 receives the counterexample file 164, and then makes the display unit 120 display an activity diagram. Now, it will be explained about an example of an activity diagram that is displayed by the display control unit 133 on the display unit 120 on the basis of the counterexample file 164 generated by the counterexample generating unit 154 with reference to FIGS. 9A to 9C. FIGS. 9A to 9C are diagrams illustrating an example of a screen (hereinafter, "consistency test result screen") that is displayed after a consistency test.

FIGS. 9A to 9C illustrate consistency test result screens in which a link from the procedure A3 to the procedure A4 is changed a link from the procedure A3 to the procedure A5 and the procedure A8 is deleted as compared to the activity diagram illustrated in FIG. 3. In this case, it is assumed that a mission diagram input by a user is the mission diagram illustrated in FIG. 2, and a faculty diagram input by the user is the faculty diagram illustrated in FIG. 4.

In this case, the constrained condition file generating unit 151 generates the constrained condition file 161 including the conditions P1 to P7 illustrated in FIG. 6, and the testing unit 153 detects a violation against the conditions P4, P6, and P7. Among them, the consistency test result screen illustrated in FIG. 9A is displayed in such a manner that the detection of a violation against the condition P4 can be visually grasped. Specifically, the consistency test result screen illustrated in FIG. 9A is displayed in such a manner that the execution possibility of a work process can be grasped without going through the procedure A4 by changing the display color of the procedure A4. In other words, according to the consistency test result screen illustrated in FIG. 9A, the termination possibility of a work process can be grasped without achieving the sub-goal "P001-02: obtain approval" in the mission diagram.

Moreover, the consistency test result screen illustrated in FIG. 9B is displayed in such a manner that the detection of a violation against the condition P6 can be visually grasped. Specifically, the consistency test result screen illustrated in FIG. 9B is displayed in such a manner that a violation against the constrained condition called "to obtain approval in case of server addition" if it does not go through the procedure A4 can be grasped by changing the display color of the procedure A4 and the procedure A7.

Moreover, the consistency test result screen illustrated in FIG. 9C is displayed in such a manner that the detection of a violation against the condition P7 can be visually grasped. Specifically, the consistency test result screen illustrated in FIG. 9C is displayed in such a manner that the termination of a work process can be grasped in a state where the user is logging in to the management server by changing the display color of the procedure A3.

The consistency test result screens illustrated in FIGS. 9A to 9C are only an example. Therefore, the counterexample generating unit 154 may generate the counterexample file 164 in such a manner that another consistency test result screen is displayed. For example, the counterexample generating unit 154 may generate the counterexample file 164 in such a manner that a cause is displayed by a character string in the vicinity of a procedure that causes the unsatisfaction of consistency.

The test result file storing unit 160 is a storage device that stores therein various types of files related to a test result. The test result file storing unit 160 stores therein the constrained condition file 161, the behavioral model file 162, the determination result file 163, and the counterexample file 164.

Next, it will be explained about the procedure of a consistency test process that is performed by the test file generation device 100 according to the present embodiment. FIG. 10 is a flowchart illustrating a consistency test processing procedure that is performed by the test file generation device 100. As illustrated in FIG. 10, the receiving unit 131 of the test file generation device 100 receives information for creating or editing a mission diagram, an activity diagram, or a faculty diagram (Step S101).

Next, when an operator guidance of starting the consistency test of a work process is received by the receiving unit 131 (Step S102: YES), the definition file generating unit 132 generates various types of definition files (Step S103). Specifically, the definition file generating unit 132 generates the mission definition file 142 on the basis of information input to create a mission diagram. Moreover, the definition file generating unit 132 generates the activity definition file 143 on the basis of information input to create an activity diagram. Moreover, the definition file generating unit 132 generates the faculty definition file 144 on the basis of information input to create a faculty diagram.

Next, when the activity definition file 143 is not generated by the definition file generating unit 132 (Step S104: NO), the display control unit 133 makes the display unit 120 display an error that means the creation of an activity diagram (Step S105).

On the other hand, when the activity definition file 143 is generated by the definition file generating unit 132 (Step S104: YES), the behavioral model generating unit 152 performs a behavioral model generation process for generating the behavioral model file 162 on the basis of the activity definition file 143 (Step S106). It will be below explained in detail about a behavioral model generation process that is performed by the behavioral model generating unit 152.

Next, when the faculty definition file 144 is generated by the definition file generating unit 132 (Step S107: YES), the behavioral model generating unit 152 performs an initial state incorporation process for incorporating an initial state into the behavioral model file 162 on the basis of the faculty definition file 144 (Step S108). On the other hand, when the faculty definition file 144 is not generated by the definition file generating unit 132 (Step S107: NO), the behavioral model generating unit 152 does not perform the initial state incorporation process. It will be below explained in detail about the initial state incorporation process that is performed by the behavioral model generating unit 152.

Next, when the mission definition file 142 is generated by the definition file generating unit 132 (Step S109: YES), the constrained condition file generating unit 151 performs a constrained condition file generation process for generating the constrained condition file 161 on the basis of the common definition file 141 and the mission definition file 142 (Step S110). It will be below explained in detail about the constrained condition file generation process that is performed by the constrained condition file generating unit 151.

On the other hand, when the mission definition file 142 is not generated by the definition file generating unit 132 (Step S109: NO), the constrained condition file generating unit 151 generates the constrained condition file 161 on the basis of the common definition file 141 (Step S111).

Next, the testing unit 153 tests whether the consistency of the work process is satisfied on the basis of the constrained condition file 161 and the behavioral model file 162 (Step S112). When the consistency of the work process is satisfied (Step S113: YES), the testing unit 153 terminates the process. At this time, the display control unit 133 may make the display unit 120 display information indicating that the consistency of the work process is satisfied.

On the other hand, when the consistency of the work process is not satisfied (Step S113: NO), the testing unit 153 generates the determination result file 163 (Step S114). Next, the counterexample generating unit 154 generates the counterexample file 164 from the determination result file 163 generated by the testing unit 153 (Step S115). Then, the display control unit 133 makes the display unit 120 display the consistency test result screen on the basis of the counterexample file 164 generated by the counterexample generating unit 154 (Step S116).

Next, it will be explained about the procedure of a behavioral model generation process that is performed by the behavioral model generating unit 152. FIG. 11 is a flowchart illustrating a behavioral model generation processing procedure that is performed by the behavioral model generating unit 152. As illustrated in FIG. 11, the behavioral model generating unit 152 extracts the order relation $T^{AD}$ from the activity definition file 143 that can be defined with a logical data structure (Step S201).

Next, the behavioral model generating unit 152 constructs a transition relation between the states "s" from the extracted order relation $T^{AD}$ (Step S202). The behavioral model generating unit 152 then extracts the precondition $Pre^{AD}$ and the post-state $Post^{AD}$ of each the node $n^{AD}$ from the activity definition file 143 (Step S203).

Next, the behavioral model generating unit 152 assigns a truth value in each the state "s" on the basis of the precondition $Pre^{AD}$ and the post-state $Post^{AD}$ (Step S204), and generates the behavioral model file 162 (Step S205).

Next, it will be explained about the procedure of an initial state incorporation process that is performed by the behavioral model generating unit 152. FIG. 12 is a flowchart illustrating an initial state incorporation processing procedure that is performed by the behavioral model generating unit 152. As illustrated in FIG. 12, the behavioral model generating unit 152 extracts a relationship between $Name1^{FD}$ of an executioner of which $Type^{FD}$ is "Role" and $Name2^{FD}$ of an authority of which $Type^{FD}$ is "Authority" on the basis of the relation $T^{FD}$ of the faculty definition file 144 that can be defined with a logical data structure (Step S301).

Next, the behavioral model generating unit 152 generates a temporal logic formula that indicates that the extracted executioner $Name1^{FD}$ has the extracted authority $Name2^{FD}$ (Step S302). Specifically, the behavioral model generating unit 152 generates Has_autority($Name1^{FD}$, $Name2^{FD}$) as a temporal logic formula.

Next, the behavioral model generating unit 152 extracts a relationship between $Name3^{FD}$ of an executioner of which $Type^{FD}$ is "Role" and $Name4^{FD}$ of an authority of which $Type^{FD}$ is "Skill" on the basis of the relation $T^{FD}$ of the faculty definition file 144 (Step S303). Next, the behavioral model generating unit 152 generates a temporal logic formula that indicates that the extracted executioner $Name3^{FD}$ has the extracted skill $Name4^{FD}$ (Step S304). Specifically, the behavioral model generating unit 152 generates Has_skill ($Name3^{FD}$, $Name4^{FD}$) as a temporal logic formula.

Then, the behavioral model generating unit 152 incorporates the temporal logic formulas generated at Steps S302 and S304 into the behavioral model file 162 as an initial state (Step S305).

Figure 13:
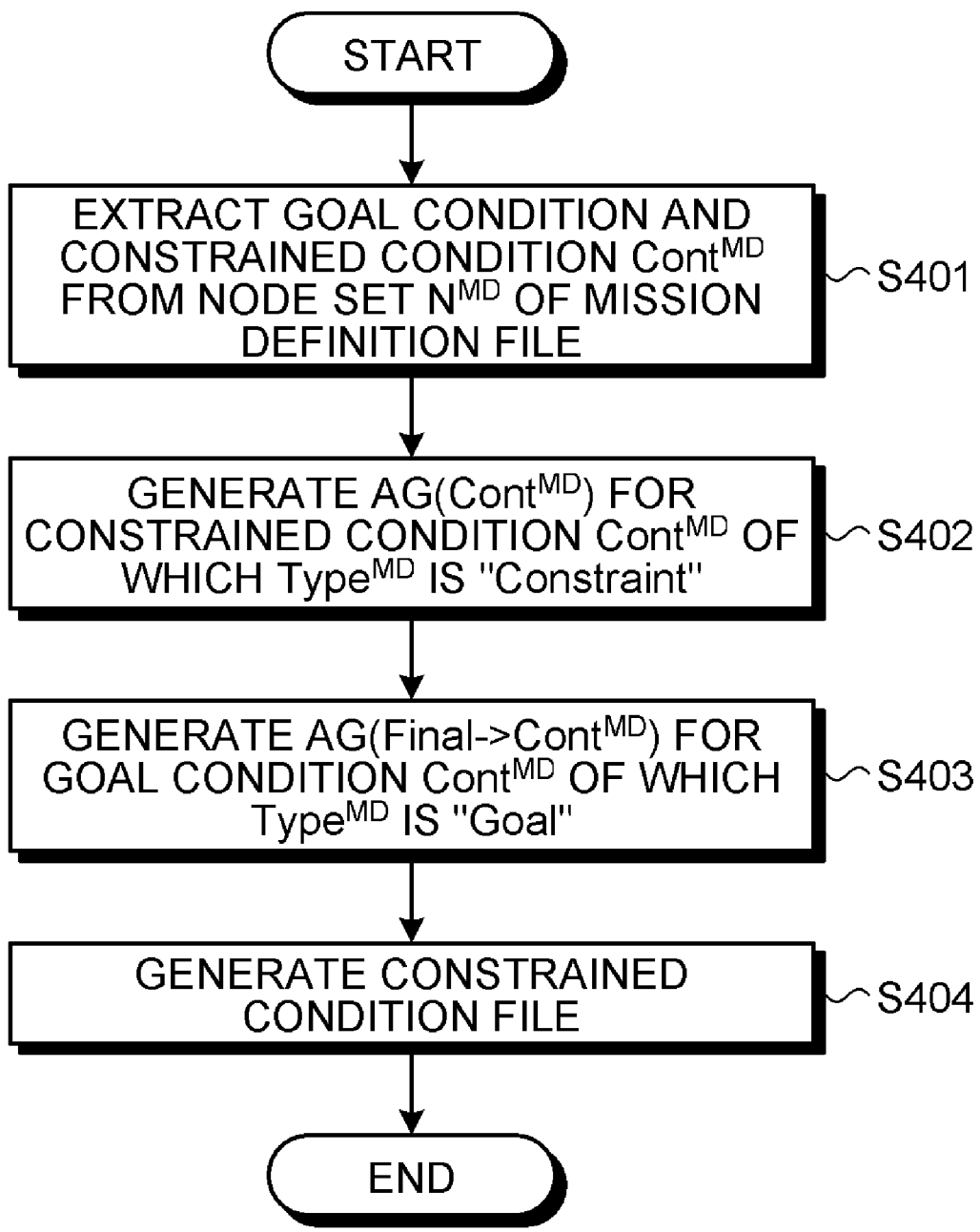
FIG. 13 is a flowchart illustrating a constrained condition file generation processing procedure that is performed by a constrained condition file generating unit.

Next, it will be explained about the procedure of a constrained condition file generation process that is performed by the constrained condition file generating unit 151. FIG. 13 is a flowchart illustrating a constrained condition file generation processing procedure that is performed by the constrained condition file generating unit 151. As illustrated in FIG. 13, the constrained condition file generating unit 151 extracts $Cont^{MD}$ that indicates a goal condition and a constrained condition from the node set $N^{MD}$ of the mission definition file 142 that can be defined with a logical data structure (Step S401).

Next, the constrained condition file generating unit 151 generates a CTL formula indicating a constrained condition that must be always satisfied on the basis of $Cont^{MD}$ of which $Type^{MD}$ is "Constraint" among the extracted $Cont^{MD}$ while the node $n^{MD}$ is being executed. Specifically, the constrained condition file generating unit 151 generates AG($Cont^{MD}$) as a CTL formula (Step S402).

Next, the constrained condition file generating unit 151 generates a CTL formula indicating a goal condition that must be satisfied after the node $n^{MD}$ is executed on the basis of $Cont^{MD}$ of which $Type^{MD}$ is "Goal" among the extracted $Cont^{MD}$. Specifically, the constrained condition file generating unit 151 generates AG(Final->$Cont^{MD}$) as a CTL formula (Step S403).

Then, the constrained condition file generating unit 151 generates the constrained condition file 161 in which the goal condition and the constrained condition expressed by the CTL formulas are described (Step S404).

As described above, the test file generation device 100 according to the present embodiment receives, in accordance with a graphical input method, a mission diagram that defines a goal, an activity diagram that defines various types of procedures, and a faculty diagram that defines the authority of an executioner, generates various types of definition files on the basis of the mission diagram, the activity diagram, and the faculty diagram, and generates the behavioral model file 162 indicative of a behavioral model on the basis of the generated definition files. Therefore, the test file generation device 100 can generate a test file for cyclopaedically performing a consistency test on a work process described with a plurality of UML diagrams.

Moreover, because the test file generation device 100 according to the present embodiment tests the consistency of a work process by using the generated behavioral model file 162, the test file generation device 100 can cyclopaedically perform a consistency test on a work process described with a plurality of UML diagrams.

In the embodiment, it has been explained about the case where the test file generation device 100 generates the behavioral model file 162 and tests the consistency of a work process on the basis of the generated behavioral model file 162. However, the test file generation device 100 may perform a process up to a generation process of the behavioral model file 162 and another information processing device may perform a consistency test process on a work process.

Moreover, the configuration of the test file generation device 100 illustrated in FIG. 1 can be variously changed without departing from the scope of the invention. For example, the functions of the definition-file output control unit 130 and the test control unit 150 of the test file generation device 100 can be installed as software and be executed by a computer to be able to realize the same functions as those of the test file generation device 100. Hereinafter, there will be illustrated an example of a computer that executes a work-process test program 1071 in which the functions of the definition-file output control unit 130 and the test control unit 150 are installed as software.

Figure 14:
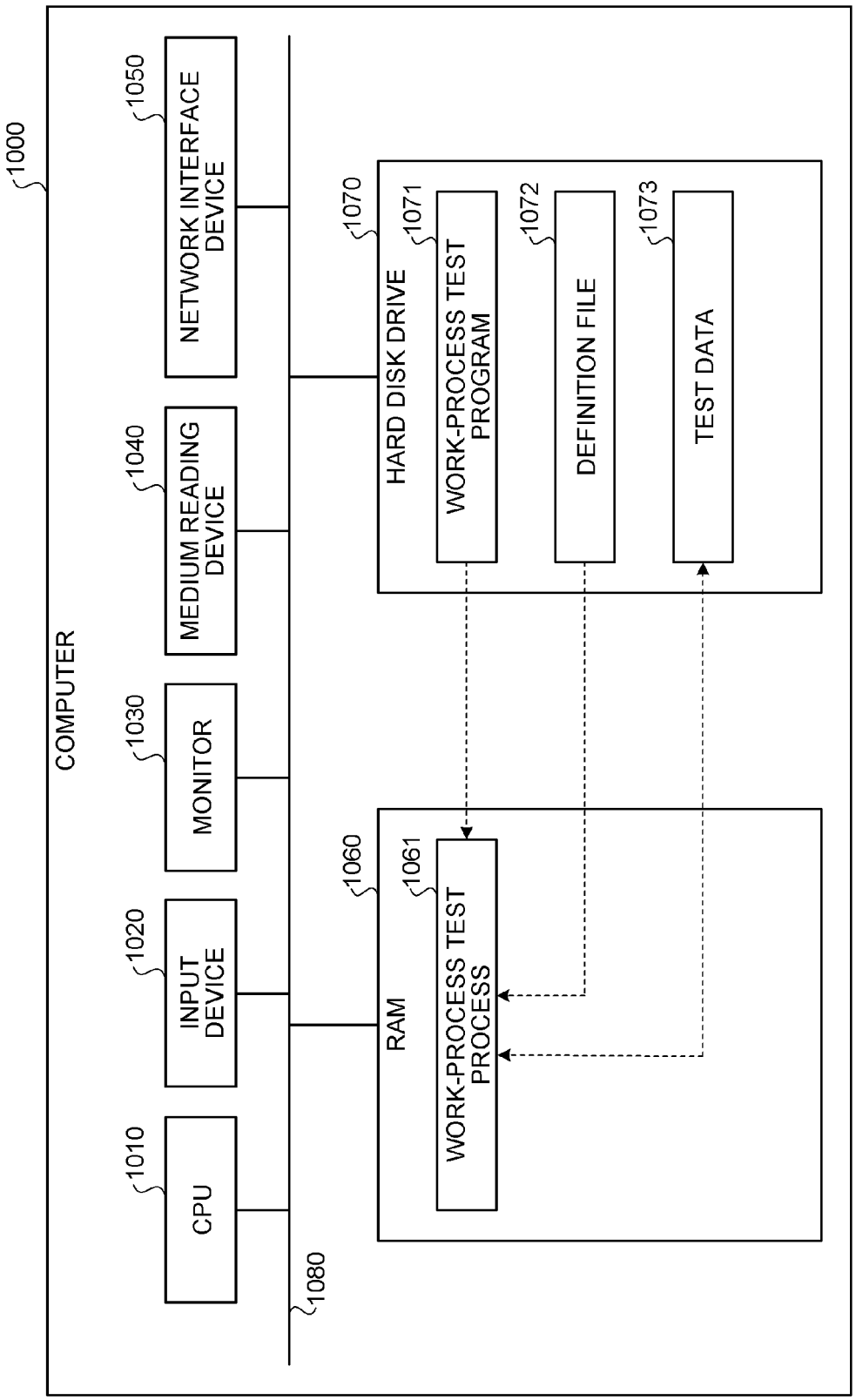
FIG. 14 is a functional block diagram illustrating a computer that executes a work-process test program.

FIG. 14 is a functional block diagram illustrating a computer 1000 that executes the work-process test program 1071. The computer 1000 includes a CPU (Central Processing Unit) 1010 that executes various types of arithmetic processing, an input device 1020 that receives data from a user, a monitor 1030 that displays various types of information, a medium reading device 1040 that reads a program and the like from a recording medium, a network interface device 1050 that gives and receives data to and from another computer via a network, a RAM (Random Access Memory) 1060 that temporarily stores various types of information, and a hard disk drive 1070, which are connected by a bus 1080.

The hard disk drive 1070 stores therein the work-process test program 1071 that has the same functions as those of the definition-file output control unit 130 and the test control unit 150 illustrated in FIG. 1, a definition file 1072 that corresponds to various types of data stored in the definition file storing unit 140 illustrated in FIG. 1, and a test data 1073 that corresponds to various types of data stored in the test result file storing unit 160 illustrated in FIG. 1. Moreover, the definition file 1072 or the test data 1073 can be appropriately distributed and be stored in another computer that is connected via a network.

The CPU 1010 reads out the work-process test program 1071 from the hard disk drive 1070 and develops the program in the RAM 1060, and thus the work-process test program 1071 functions as a work-process test process 1061. Then, the work-process test process 1061 appropriately develops information read from the definition file 1072 and the test data 1073 in an area assigned to itself on the RAM 1060 and executes various types of data processing on the basis of the developed data.

The work-process test program 1071 is not necessarily stored in the hard disk drive 1070. For example, the program stored in a storage medium such as CD-ROM may be read and executed by the computer 1000. Moreover, the program may be stored in another computer (or server) that is connected to the computer 1000 via a public line, Internet, LAN (Local Area Network), WAN (Wide Area Network), or the like, and be read and executed by the computer 1000.

Further, it is possible to apply components, expressions, or arbitrary combinations of components of the test file generation program disclosed in the present application to a method, a device, a system, a computer program, a recording medium, a data structure, or the like.

According to an aspect of the present invention as disclosed in the present application, a test file for cyclopaedically performing a consistency test on a work process described with a plurality of UML diagrams can be generated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable, non-transitory medium having stored therein a test file generation program for generating a test file for testing a consistency of a work process, the test file generation program causing a computer to execute a process comprising:

receiving various types of definition information relating to various types of procedures included in the work process, execution sequence of the various types of procedures, a final goal that is a goal that is finally achieved in the work process, sub-goals that are goals that are achieved in the various types of procedures, a constrained condition that is observed when the various types of procedures are executed, an executioner who executes the various types of procedures, and an authority for determining a procedure that can be executed by the executioner;

generating a definition file on the basis of the various types of definition information received at the receiving; and generating a test file that indicates a behavioral model when the work process is executed on the basis of the definition file generated at the generating.

2. The computer-readable, non-transitory medium according to claim 1, wherein the receiving includes receiving a definition diagram that is a diagram in which the various types of definition information is expressed by a graphic and a character string as the various types of definition information, and the generating includes generating a definition file on the basis of the definition diagram received at the receiving.

3. The computer-readable, non-transitory medium according to claim 2, wherein the receiving includes receiving, as the definition diagram, a mission diagram that is a definition diagram in which the final goal, the sub-goals, and the constraint are defined, an activity diagram that is a definition diagram in which the various types of procedures, the execution sequence, and the executioner are defined, and a faculty diagram that is a definition diagram in which an authority of the executioner is defined.

4. The computer-readable, non-transitory medium according to claim 2, wherein the receiving includes receiving a definition diagram that is described in conformity with a UML (Unified Modeling Language) notation.

5. The computer-readable, non-transitory medium according to claim 1, wherein the test file generation program making a computer to further execute testing whether the consistency of the work process is satisfied on the basis of the behavioral model generated at the generating.

6. The computer-readable, non-transitory medium according to claim 5, wherein the testing includes testing whether the sub-goals are achieved when the various types of procedures are executed, whether the constrained condition is observed when the various types of procedures are executed, whether the various types of procedures are executed by the executioner having the authority, and whether the final goal is achieved.

7. The computer-readable, non-transitory medium according to claim 5, wherein the test file generation program making a computer to further execute displaying a procedure that causes the consistency to be dissatisfied on a predetermined display unit in such a manner that the procedure can be identified when it is determined at the testing that the work process does not satisfy the consistency.

8. A test file generation device for generating a test file for testing a consistency of a work process, the test file generation device comprising:

a receiving unit that receives various types of definition information relating to various types of procedures included in the work process, execution sequence of the various types of procedures, a final goal that is a goal that is finally achieved in the work process, sub-goals that are goals that are achieved in the various types of procedures, a constrained condition that is observed when the various types of procedures are executed, an executioner who executes the various types of procedures, and an authority for determining a procedure that can be executed by the executioner;

a definition file generating unit that generates a definition file on the basis of the various types of definition information received by the receiving unit; and a behavioral model generating unit that generates a test file that indicates a behavioral model when the work process is executed on the basis of the definition file generated by the definition file generating unit.

9. The test file generation device according to claim 8, wherein
the receiving unit receives a definition diagram that is a diagram in which the various types of definition information is expressed by a graphic and a character string as the various types of definition information, and
the definition file generating unit generates a definition file on the basis of the definition diagram received by the receiving unit.

10. The test file generation device according to claim 9, wherein the receiving unit receives, as the definition diagram, a mission diagram that is a definition diagram in which the final goal, the sub-goals, and the constraint are defined, an activity diagram that is a definition diagram in which the various types of procedures, the execution sequence, and the executioner are defined, and a faculty diagram that is a definition diagram in which an authority of the executioner is defined.

11. The test file generation device according to claim 9, wherein the receiving unit receives a definition diagram that is described in conformity with a UML (Unified Modeling Language) notation.

12. The test file generation device according to claim 8, further comprising
a testing unit that tests whether the consistency of the work process is satisfied on the basis of the behavioral model generated by the behavioral model generating unit.

13. The test file generation device according to claim 12, wherein the testing unit tests whether the sub-goals are achieved when the various types of procedures are executed, whether the constrained condition is observed when the various types of procedures are executed, whether the various types of procedures are executed by the executioner having the authority, and whether the final goal is achieved.

14. The test file generation device according to claim 12, wherein further comprising a display control unit that controls a predetermined display unit to display a procedure that causes the consistency to be dissatisfied in such a manner that the procedure can be identified when it is determined by the testing unit that the work process does not satisfy the consistency.

15. A test file generation method performed by a test file generation device that generates a test file for testing a consistency of a work process, the test file generation method comprising:
receiving various types of definition information relating to various types of procedures included in the work process, execution sequence of the various types of procedures, a final goal that is a goal that is finally achieved in the work process, sub-goals that are goals that are achieved in the various types of procedures, a constrained condition that is observed when the various types of procedures are executed, an executioner who executes the various types of procedures, and an authority for determining a procedure that can be executed by the executioner;
generating a definition file on the basis of the various types of definition information received in the receiving; and
generating a test file that indicates a behavioral model when the work process is executed on the basis of the definition file generated.

\* \* \* \* \*